July 27, 1965   R. SEIBEL   3,197,010
MACHINE CONTROL DEVICES
Filed Aug. 26, 1960   4 Sheets-Sheet 1

INVENTOR
ROBERT SEIBEL
BY Francis J. Thomas
ATTORNEY

July 27, 1965   R. SEIBEL   3,197,010
MACHINE CONTROL DEVICES

Filed Aug. 26, 1960   4 Sheets-Sheet 2

July 27, 1965  R. SEIBEL  3,197,010
MACHINE CONTROL DEVICES
Filed Aug. 26, 1960  4 Sheets-Sheet 3

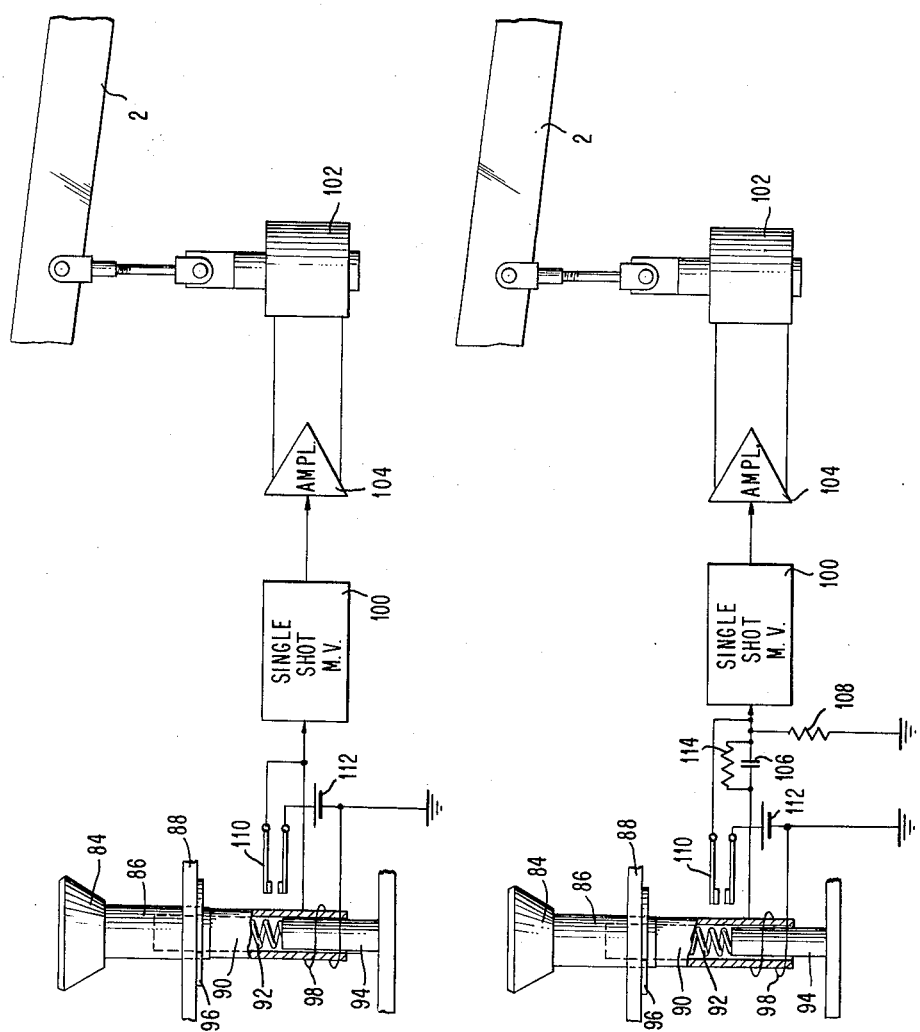

United States Patent Office 3,197,010
Patented July 27, 1965

3,197,010
MACHINE CONTROL DEVICES
Robert Seibel, Putnam Valley, N.Y., assignor to International Business Machines Corporation, New York, N.Y., a corporation of New York
Filed Aug. 26, 1960, Ser. No. 52,307
5 Claims. (Cl. 197—17)

This invention relates to machine control devices, and in particular, to velocity-sensitive and acceleration-sensitive devices that provide discrete outputs to positively control machines. These devices are especially suitable for use as input apparatus for typewriters and other key-controlled devices.

Velocity-sensitive transducer devices that provide analog output forces are available in the art. Such a device is used in many conventional non-electric typewriters, where the type bar is thrown against the platen when the key velocity exceeds a predetermined amount. In these devices, the keyboard mechanism provides an analog output force: the type bar strikes the platen with a force dependent upon the velocity of movement of the key. There are a number of key-controlled devices that provide discrete output forces from displacement-sensitive input mechanisms. When a key on a well known model of an electric typewriter is sufficiently displaced, a positive type-bar movement occurs, regardless of the speed of movement of the key.

The present invention is directed to machine control devices that provide discrete output forces when the velocity or acceleration of the control exceeds a predetermined level. Velocity-sensitive and acceleration-sensitive machine control have the chief advantage of requiring intentional machine control, minimizing certain accidental machine operations due to slight displacements of the input transducers.

One object of this invention is to provide mechanical and electromechanical velocity-sensitive, discrete-output, control devices for machines.

A further object of this invention is to provide mechanical and electromechanical acceleration-sensitive, discrete-output, control devices for machines.

A further object is to provide discrete-output control devices for machines that are both velocity-sensitive and displacement-sensitive.

Another object is to provide discrete-output control devices for machines that are both acceleration-sensitive and displacement-sensitive.

A further object is to provide velocity-sensitive and acceleration-sensitive machine control devices using mechanical differentiators comprising air pots.

Another object is to provide velocity-sensitive and acceleration-sensitive machine control devices using mechanical differentiators comprising hydraulic dash pots.

Another object is to provide velocity-sensitive and acceleration-sensitive machine control devices using electromechanical differentiators comprising relatively movable electric coils and slugs.

The foregoing and other objects, features and advantages of the invention will be apparent from the following more particular description of preferred embodiments of the invention, as illustrated in the accompanying drawings.

The above described objects and purposes of the invention are illustrated in the following manner.

Velocity-sensitive and acceleration-sensitive machine control devices are illustrated using mechanical and electromechanical input transducers and developing positive, discrete, mechanical output movements when their input velocities or accelerations exceed predetermined levels.

A mechanical velocity-sensitive embodiment is illustrated and described that utilizes a mechanical differentiator to develop a displacement dependent upon the velocity of depression of a key. The mechanical displacement thus obtained is used to control an electric typewriter type bar mechanism such that the type bar is driven against the platen when the displacement (dependent upon velocity) exceeds a predetermined level.

A mechanical acceleration-sensitive embodiment is shown and described that utilizes a mechanism to develop a displacement dependent upon the acceleration of depression of a key. This displacement is also used to control the driving of a type bar against a platen when the displacement (dependent upon acceleration) exceeds a predetermined level.

The mechanical embodiments are provided to illustrate type bar operation when the velocity or acceleration of key depression is insufficient but the key is displaced beyond a predetermined distance.

Electromechanical velocity-sensitive and acceleration-sensitive machine control devices are shown and described in electric typewriter embodiments utilizing key-controlled differentiators comprised of relatively movable coils and magnets to generate voltages dependent upon the velocity of displacement of the keys. A second differentiator is provided for acceleration-sensitive control. In addition, the electromechanical embodiments provide type bar operation when the keys are displaced beyond a predetermined distance, regardless of the velocity or acceleration levels.

In the drawings:

FIGURE 10 is a diagram showing an electromechanical key-controlled, velocity-sensitive type-bar control mechanism.

FIGURE 11 is a diagram showing electromechanical, key-controlled, acceleration-sensitive, type-bar control mechanism.

Figure 1:
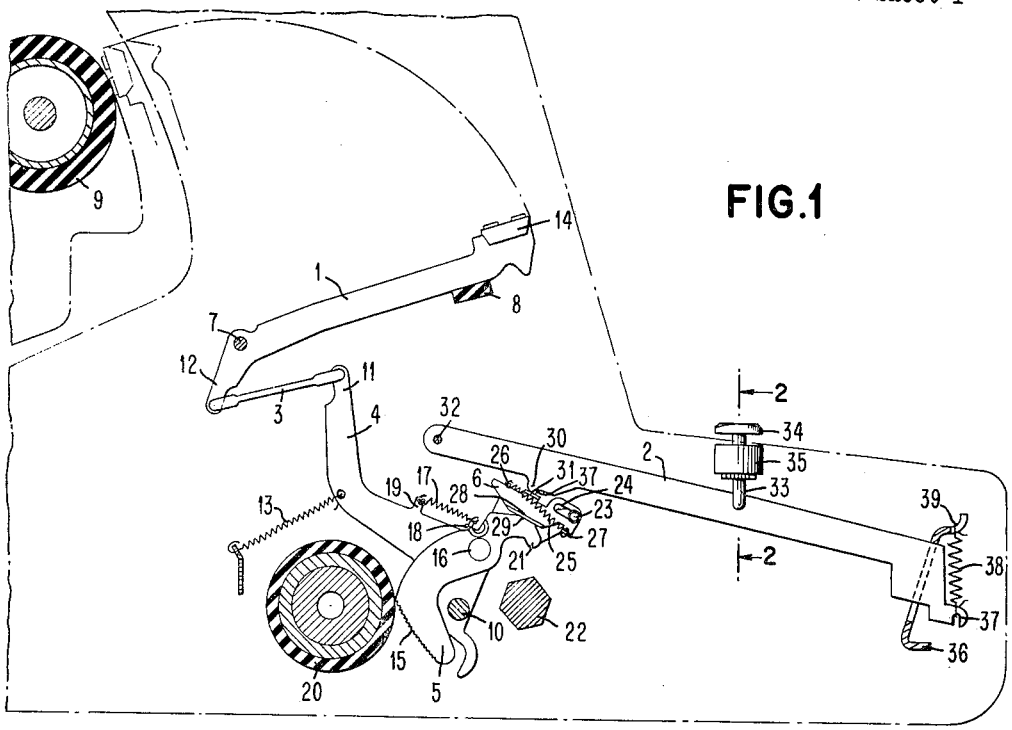
FIGURE 1 is a side view of a mechanical key-controlled, velocity-sensitive, type bar control mechanism.

With reference to FIGURE 1, a type bar 1 is shown positioned for operation, in response to depression of a key bar 2, through an interconnecting structure comprising a link 3, a crank arm 4, a cam 5, and an actuating plate 6. The type bar 1 is pivoted about the usual hoop-shaped shaft 7 for rotation from a rest position—i.e. from a basket 8, to the platen 9, thereby to effect the imprinting of a character on a work sheet (not shown) in the usual manner.

Crank arm 4 is positioned for pivotal rotation about a transverse shaft 10 which extends across the base of a typewriter. Shaft 10 supports a plurality of crank arms; i.e. one for each type bar. The rotation of crank arm 4 about shaft 10 actuates its associated type bar 1 to rotate the latter about shaft 7 through means of the link 3 which interconnects the head 11 of crank arm 4 and an operating lever 12, an integral part of type bar 1. Crank arm 4 is biased by a spring 13 in a direction to restore the crank arm to its normal or rest position, as shown in FIG. 1. The rest position is defined as that position of crank arm 4 which exists when the head 14 of the type bar 1 is in engagement with basket 8.

To effect pivotal movement of the crank arm 4 about shaft 10, cam 5, which has a serrated tread 15, is mounted for angular movement on a pivot or stud 16 supported by the crank arm 4. A cam spring 17 extends between a loop 18 on the cam 5 and an ear 19 on the crank arm 4 for biasing cam 5 normally counterclockwise to the disengaged position shown in FIG. 1. In this position, the serrated tread 15 is just out of engagement with the periphery of a power roll 20 which is driven by some motor source for rotation at a constant rate in a counterclockwise direction.

The serrated tread 15 of cam 5 is eccentric with respect to pivot 16, and accordingly, when the tread is brought into engagement with power roll 20, a frictional drive is obtained between the peripheral surface of the power roll and the serrated tread, causing the cam 15 to swing upwardly and clockwise about the pivot 16, thereby forcing the latter outwardly from the power roll and clockwise about shaft 10. This clockwise movement of stud 16 rotates crank arm 4 about shaft 10 to actuate the type bar 1. The length of the serrated tread that engages the peripheral surface of the power roll 20 controls the duration of the direct drive of the type bar 1; that is, it controls the height to which the type bar will be driven under direct power. During the rest of the type bar motion towards the platen 9, i.e. after direct drive ceases, the type bar is in free flight and travels under its own momentum.

During a print stroke, the type head 14 is moved towards the platen 9 as the stud 16 is forced away from the peripheral surface of the power roll 20. When the stud 16 is removed from the peripheral surface a distance greater than the radial distance from the stud to the point on the serrated tread 15 lying in a line joining the centers of the power roll and stud 16, then the frictional drive between the power roll and the serrated tread ceases, and the spring 17 acts to rotate the cam counterclockwise about stud 16 to its normal or rest position relative to crank arm 4. This disengagement between the tread and power roll 20 always takes place before a type head strikes the platen, consequently, as a type bar returns to its rest position, the spring 17 holds the cam out of engagement with the power roll and a print stroke is complete when type head 14 strikes basket 8.

In a preferred embodiment, cam 5 has a tail piece 21 which is engageable with a control stop 22 to limit the rotation of the cam about stud 16. The purpose of this is to limit the direct drive of a type bar, and consequently the force with which the type head 14 strikes a platen 9. When the tail piece 21 comes in contact with the control stop, the direct drive of the type bar ceases and the type bar must then continue under its momentum to strike the platen. In effect, the engagement of the tail piece 21 with control stop 22 limits the rotation of the cam 5 about stud 16, thereby preventing any surface of greater radius of the serrated tread from coming into contact with the peripheral surface of the power roll 20, and accordingly, the direct drive of the type bar ceases. It might appear that this engagement would also prevent any further movement of the type bar 1, but actually, the tail piece, when it engages control stop 22, slides laterally along one of the stop surfaces away from the power roll until the cam is free. The spring 17 then rotates the cam counterclockwise about stud 16 to its retracted or normal position out of engagement with power roll 20. The type bar, however, travels in free flight from the instant that the tail piece 21 strikes the control stop 22.

In order to initiate a type bar print stroke, the serrated tread 15 must be brought into engagement with the peripheral surface of the power roll 20. In the disclosed embodiment, an actuating plate 6 is employed to initiate tread engagement. The plate is supported for both pivotal and sliding motion with respect to a stud 23 which is carried by the crank arm 4. Specifically, the actuating plate 6 is provided with an elongated or generally elliptical aperture 24 for mounting on stud 23 to permit movement downwardly to the right, as indicated in FIG. 1, a distance equal to the difference in the transverse or long diameter of the aperture 24 and the diameter of stud 23. The purpose of this sliding movement will be hereinafter explained. A plate spring 25 interconnected between an ear 26 on crank arm 4 and an ear 27 on the plate 6, normally pulls the actuating plate 6 upwardly into the position shown in FIG. 1. It is to be noted that the ear 26 serves the dual function of supporting an end of the spring 25 and of guiding the movement of the actuating plate 6; that is, it limits clockwise movement of the plate about stud 23, and it helps guide the lateral movement of the plate 6 under the influence of spring 25.

The actuating plate 6 is provided with a cam ear 28 positioned for engagement with an actuating or camming surface 29 on the cam 5. Any rotation of the actuating plate 6 about its support stud 23 will cause the cam ear 28 to push on camming surface 29, thereby rotating cam 5 on stud 16 clockwise to force the serrated tread 15 into engagement with the periphery of the power roll 20.

In order to rotate plate 6, an operating lug 30 is positioned on the key bar 2 for engagement with a key ear 31 carried by the actuating plate 6. The key bar is supported for rotation about a shaft 32 and any clockwise angular movement of the key bar about support shaft 32 causes lug 30 to act on key ear 31 to rotate the plate 6 about its pivot 23 for actuating the cam 5 so as to bring the serrated tread 15 into engagement with the peripheral surface of the power roll 20, thus actuating type bar 1 for a print stroke.

The operating lug 30 and the key ear 31 coact to prevent multiple key-action as will be described below. The shaft 32 which supports the key bars—there being one key bar for each type bar—extends transversely across the typewriter. Each key bar has a button stem 33, a finger button 34, and a mechanical differentiating mechanism 35. This mechanism 35 may be either an air pot (as described below) or a hydraulic dash pot or other mechanical differentiator. The output (stem 33) of the differentiating mechanism 35 is displaced by an amount dependent upon the velocity of movement of the input finger button 34. By changing the position of the stem 33, that is, by locating it along the length of the key bar 2 at any one of four positions, the normal typewriter keyboard is obtained. The outer end of each key is supported for controlled movement in a guide comb 36 which is provided with a plurality of guide slots, each having a length great enough to permit the desired pivotal movement of a key bar for actuating its assigned type bar. Each key bar has at its outer extremity a hooked end 37 which holds one end of a restoring spring 38. The other end of the spring 38 is mounted on a suitable finger 39 forming a portion of the guide comb 36. With this structure, the restoring spring 38 tends to maintain each key bar in its retracted or normal position as shown in FIG. 1.

Figures 2, 3:
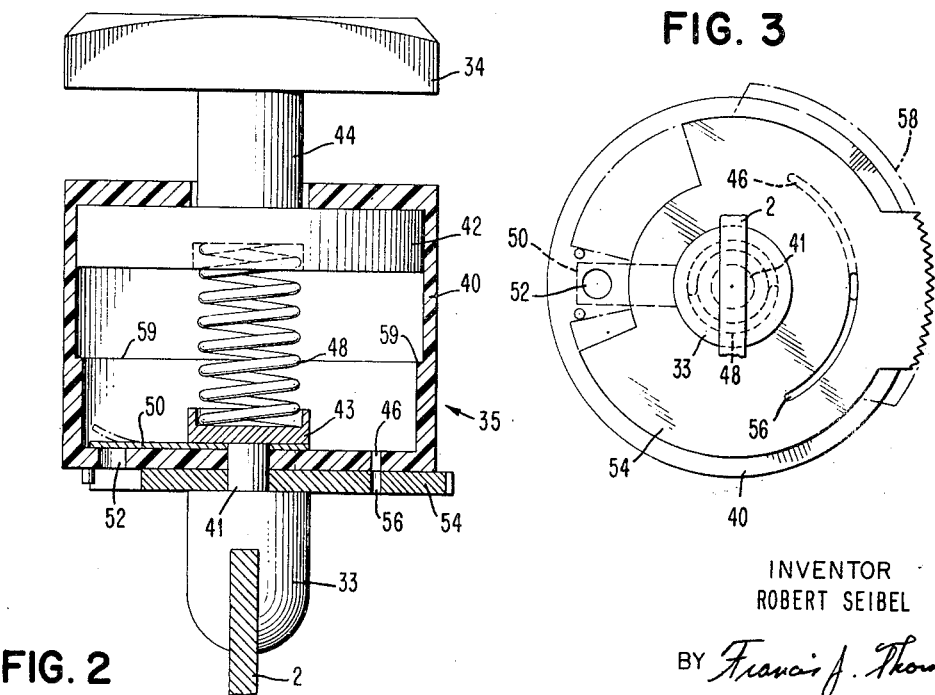
FIGURE 2 is an enlarged sectional view of a mechanical differentiator that could be used in the embodiment of FIGURE 1, taken along the plane indicated as 2—2.
FIGURE 3 is a bottom view of the mechanical differentiator shown in FIGURE 2.

A mechanical differentiator 35 that could be used in the embodiment of FIG. 1 is shown in detail in FIGS. 2 and 3 to be an air pot essentially comprised of a cylinder 40 containing a piston 42. The cylinder 40 is rigidly mounted on an extension 41 of the button stem 33 by a pressure-fitted plate 43. The stem is also mounted on the key bar 2. The piston 42 contains a rod 44 which is rigidly affixed to the finger button 34. A small opening 46 is provided in the cylinder wall to permit the escape of air when the piston is moved by depression of the finger button 34.

The displacement of the button stem 33 is dependent upon the velocity of movement of the finger button 34;

the more rapidly the finger button is depressed, the greater the displacement of the stem. This reaction occurs because the opening 46 limits the velocity of escape of air in the cylinder. Thus, a low-velocity depression of the finger button provides little or no displacement of the stem, as the air in the cylinder escapes through the opening and the piston moves with respect to the cylinder until reaching a stop 59.

A compression spring 48, located between the piston 42 and plate 43, provides the necessary force to return the piston to its original position after its operation. This spring 48 is inadequate to overcome the counterclockwise bias on the key bar 2 provided by the restoring spring 38. While the piston is being returned, the valve 50 opens, permitting air to rapidly enter the cylinder through another opening 52.

The velocity of air flow through opening 46 is controlled by control means, e.g., a plate 54 which is rotatably mounted on the button stem extension 41 so as to control the effectiveness of the control means. The plate 54 is shown in detail in FIG. 3 to contain an elongated opening 56 having a shape similar to opening 46 in the cylinder wall. The effective size of opening 46 is controlled by the position of the plate. A serrated edge 58 facilitates this control.

A hydraulic dash pot or other mechanical differentiator may be used in place of the air pot.

Figure 4:
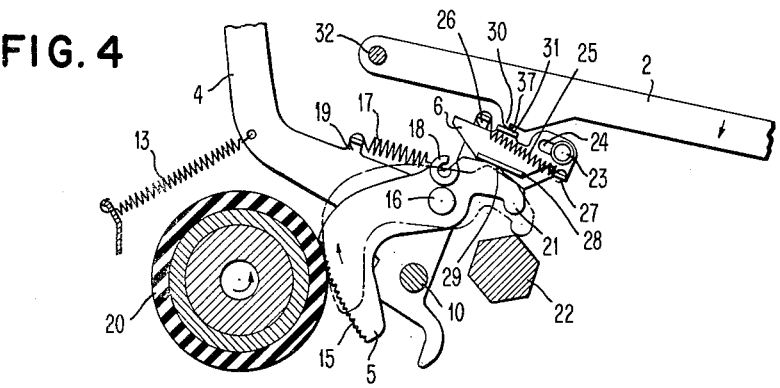
FIGURES 4, 5 and 6 are side views of part of the type bar mechanism of FIGURE 1, shown in various positions of operation.
Figure 5:
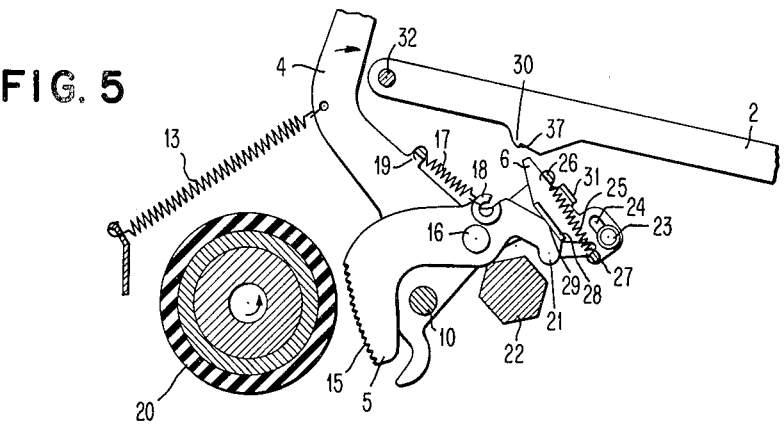
Figure 6:
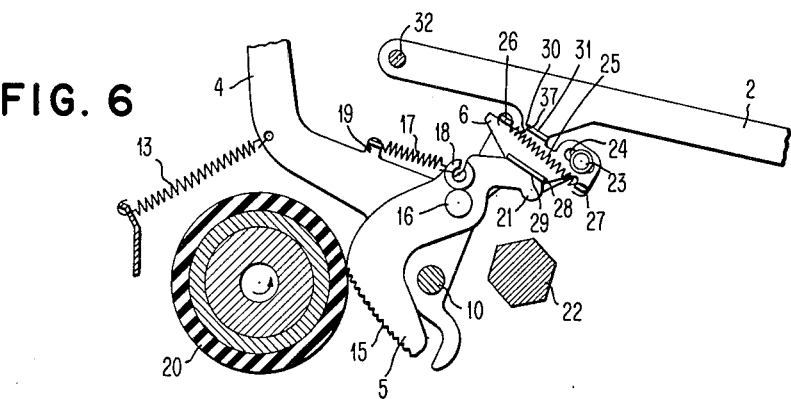

Reference is now made to FIGS. 4, 5 and 6 for an explanation in detail of the actuation of a type bar. FIG. 4 shows the relation of the parts when a key bar is first depressed; FIG. 5 shows the parts just after the type head 14 has struck the platen; and FIG. 6 shows the parts after the type head has returned into engagement with the basket 8, with the key bar maintained depressed.

Referring to FIG. 4, key bar 2 is shown depressed wherein the operating lug 30 has rotated the plate 6 about stud 23 to effect engagement of the serrated cam tread 15 with the peripheral surface of the drive roller 20. From this position, the cam 5 is driven by the power roll about the stud 16, and the continually increasing radius between stud 16 and the serrated tread 15 forces the stud 16 clockwise about shaft 10, thereby rotating the crank arm 4 to drive the type bar directly until the tail piece 21 hits the control stop 22. At this position, and in the manner previously described, the serrated tread 15 is disengaged from the peripheral surface of power roll 20, and the spring 17 rotates the cam 5 counterclockwise about stud 16 back to its retracted position, as shown in FIG. 1. In the retracted position, the cam surface 29 engages the ear 28 on the plate 6 and holds the latter in a position with its upper edge engaging the ear 26 on the crank arm 4, as shown in FIG. 5.

While the type bar 1 is being driven against the platen and then returned to the basket 8, the spring 25 holds the plate 6 upwardly and to the left, FIG. 5, with stud 23 in engagement with the right end peripheral surface of the aperture 24.

If the key bar 2 is held depressed as shown in FIGS. 5 and 6, then as the crank arm 4 rotates counterclockwise upon return of the type bar, the key ear 31 will engage the front edge 37 (FIG. 6) of the lug 30 and thereby prevent a repeat stroke of type bar 1. It follows that plate 6 will be displaced slightly by the lug 30 against the action of the spring 25, as shown in FIG. 6. When the key bar 2 is permitted to return to its normal position (FIG. 1), lug 30 is raised out of engagement with the key ear 31 and spring 25 causes plate 6 to return to its normal position.

As shown in FIGS. 1 and 2, the type bar mechanism may be actuated without a high velocity depression of the finger button 34, if the button is sufficiently displaced. A slow depression of the finger button causes the piston 42 to move toward the bottom of the cylinder 40 until the piston engages the stop 59, and a further depression, at any speed, causes the cylinder to be displaced by a mechanical motion independent of the air pressure in the cylinder.

The apparatus described with respect to FIGS. 1 through 6 provides for mechanical, velocity-sensitive, control of a machine. The apparatus to be described with respect to FIGS. 7, 8 and 9 provides acceleration-sensitive, mechanical control.

Figure 7:
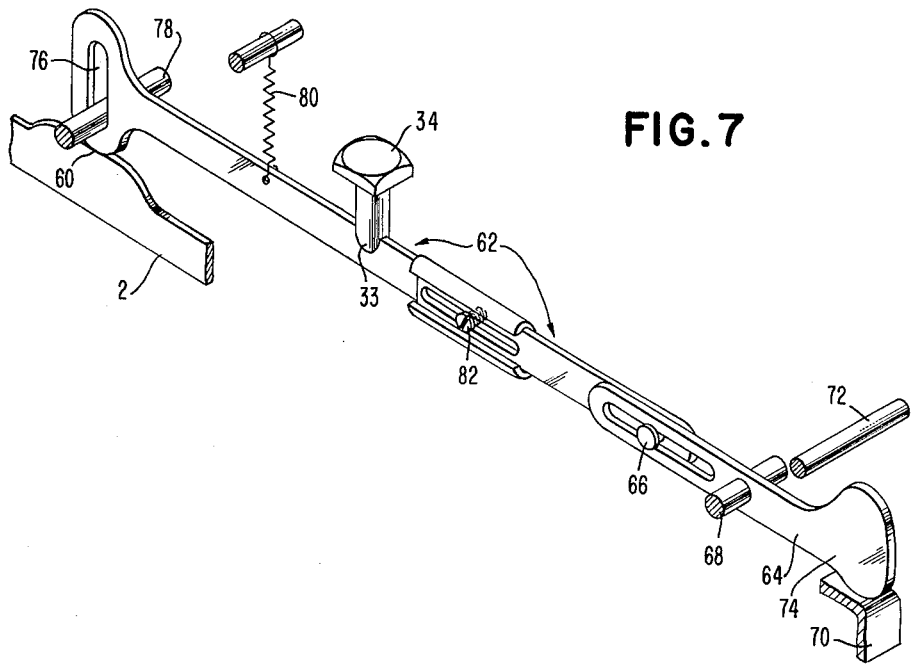
FIGURE 7 is an orthographic projection of a mechanical key-controlled, acceleration-sensitive type-bar control mechanism.

In FIG. 7, the displacement of the key bar 2 is controlled by a cam surface 60 on a control bar 62. The control bar is connected to an arm 64 by a pivot 66. Arm 64 is pivotably mounted on a rod 68 for movement between stops 70 and 72. The arm 64 contains an extension 74 having a relatively large mass which biases the arm in a clockwise direction. The control bar contains a slot 76 which surrounds a rod 78 to permit the bar to both slide and rotate on the rod. A spring 80 provides an upward bias on the control bar 62. A finger button 34 is mounted on the control bar 62.

Figure 8:
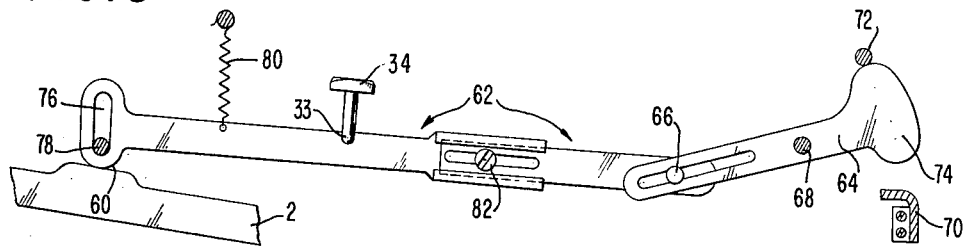
FIGURES 8 and 9 are side views of part of the type-bar mechanism of FIGURE 7, shown in various positions of operation.
Figure 9:
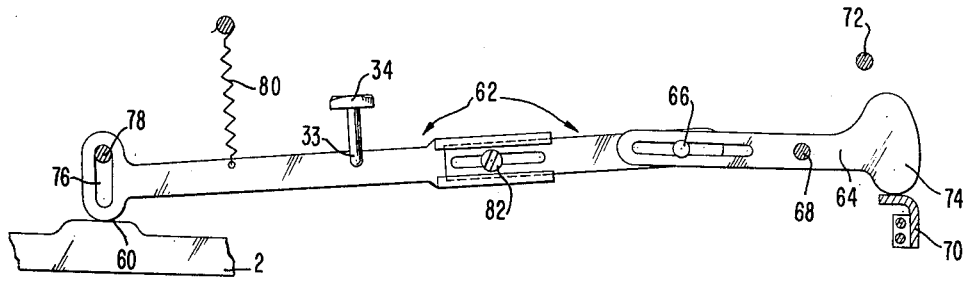

Low acceleration depression of the button 34 results in the operation shown in FIG. 8. In this case, the control bar moves with a low acceleration causing the weighted arm 64 to rotate in a counterclockwise direction: the spring 80 maintains the left end of bar 62 in its normal position and the key bar 2 is not moved. In contrast to this, when the button is depressed with a high acceleration the inertia of the weighed arm 64 resists rotation and the bar 62 rotates counterclockwise about pivot 66, causing the left end of the bar to drop, depressing key bar 2, as shown in FIG. 9.

The amount of acceleration required to activate the key bar 2 in the mechanism of FIG. 7 is dependent upon the length of the control bar 62. The bar may be varied in length when screw 82 is loosened.

The mechanism of FIG. 7 may be activated by a low-acceleration depression of the button, if the distance depressed is sufficient to move the weighted arm against stop 72, and then further to move the key bar 2.

Since $$A = f\left(\frac{d^2s}{dt^2}\right) = f\left(\frac{dv}{dt}\right)$$

two mechanical differentiators could be placed in series to obtain an acceleration-sensitive mechanism. Other mechanisms with outputs dependent upon acceleration, velocity, rate of acceleration and displacement may be readily constructed using various serial and parallel arrangements of differentiators.

An electromechanical, velocity-sensitive device is shown in FIG. 10. An electromechanical differentiator is used to generate a voltage dependent upon the velocity of movement of the input transducer. A finger button 84 is mounted on a button stem 86 which is located in a hole in a mounting plate 88. A hollow cylindrical magnet 90 is also mounted on the stem 86. A compression spring 92 acting against a mount 94 applies an upward bias on the stem 86. A flange 96 limits the upward movement of the stem. A coil 98, having a diameter larger than the outer diameter of the magnet 90, is placed axially in line, surrounding the magnet.

Depression of the button 84 causes a voltage to be induced in the coil 98, which is applied to trigger a single-shot multivibrator 100 or any other monostable circuit which generates a gate upon application of a pulse. The multivibrator output operates a solenoid 102 through an amplifier 104. The solenoid, in turn, causes key bar 2 to be displaced. Thus the type bar 1 (FIG. 1) strikes the platen 9 when the velocity of button 84 is sufficient to generate a voltage large enough to trigger the multivibrator 100. The multivibrator output gate is of sufficient duration to operate the solenoid. The signal from the coil 98 may be amplified or attenuated to control the velocity of button movement required to operate the multivibrator.

An electromechanical acceleration-sensitive machine is shown in FIG. 11 to be similar to the velocity-sensitive device shown in FIG. 10, with the essential addition of a second differentiator—an electronic circuit comprised of a capacitor 106 and a resistor 108. In this case, the key bar is operated when the acceleration of the button exceeds a value that is determined only by the circuit components.

A switch 110 is shown in FIGS. 10 and 11 that is operated by the flange 96 when the button 84 is sufficiently displaced. In this case a signal from a source 112 is applied to the multivibrator 100, causing operation of the circuit. Thus, a button displacement exceeding a predetermined level causes circuit operation regardless of velocity and acceleration.

Operation of the device of FIG. 11 is made dependent upon a function of acceleration and velocity by the addition of a resistor 114 which applies part of the velocity signal from coil 98 to the input of the multivibrator 100. The electromechanical devices of FIG. 11 may be modified to be dependent upon rate of acceleration or combinations of this function and acceleration and velocity by simple modifications.

What has been shown and described are various velocity-sensitive and acceleration-sensitive devices suitable for machine control. These devices require intentional machine control, minimizing certain accidental machine operations due to slight displacements of input transducers.

While the invention has been particularly shown and described with reference to preferred embodiments thereof, it will be understood by those skilled in the art that various changes in form and details may be made therein without departing from the spirit and scope of the invention.

What is claimed is:

1. An apparatus comprising, in combination: a manually-operable actuator for providing a mechanical output displacement; a mechanical differentiator having its input connected to the actuator for generating an output displacement dependent upon the velocity of movement of the actuator; control means for controlling the effectiveness of differentiation of said mechanical differentiator dependent upon said velocity; means for controlling the effectiveness of said first-named control means by relative positioning thereof; and output means responsive to the actuator output displacement and the differentiator output displacement, when a function of these displacements exceeds a predetermined amount for generating a fixed output force.

2. In a key-controlled machine, the improvement comprising, in combination: a manually-operable actuator providing a mechanical output displacement; coupling means having its input connected to the actuator output and comprising at least one stage of differentiation for providing an output dependent upon a function of velocity; control means for controlling the effectiveness of differentiation dependent upon said function of velocity; means for controlling the effectiveness of said first-recited control means by relative positioning thereof; and output means responsive to the output of the coupling means, for generating a fixed output force when the output of the coupling means exceeds a predetermined level.

3. An apparatus comprising, in combination: a plurality of manually-operable actuators, each providing a mechanical output displacement; a plurality of mechanical differentiators, each having an input connected to an actuator for generating a displacement dependent upon the velocity of movement of the actuator; a plurality of control means for controlling the effectiveness of differentiation of said mechanical differentiators dependent upon said velocity, individual ones of said control means being included within individual ones of said mechanical differentiators; a plurality of means for controlling the effectiveness of said first-recited control means by relative positioning thereof, individual ones of said last-recited means being connected to individual ones of said mechanical differentiators; and a plurality of output means, each responsive to a differentiator output displacement of a predetermined amount for generating a fixed output force.

4. The apparatus described in claim 3, wherein the differentiators are air pots.

5. An apparatus, comprising, in combination: a plurality of manually-operable actuators, each providing a mechanical output displacement; a plurality of mechanical differentiators comprising air pots each having an outlet to restrict the flow of air and each having an input connected to an actuator for generating a displacement that is dependent upon the velocity of movement of the actuator; a plurality of control means for controlling the area of said outlet and thereby the effectiveness of differentiation of said mechanical differentiators dependent upon said velocity, individual ones of said control means being included within individual ones of said mechanical differentiators; a plurality of means for controlling the effectiveness of said first-recited control means by relative positioning thereof, individual ones of said last-recited means being connected to individual ones of said mechanical differentiators; and a plurality of output means, each responsive to a differentiator output displacement of a predetermined amount for generating a fixed output force.

References Cited by the Examiner

UNITED STATES PATENTS

| | | | |
|---|---|---|---|
| 358,939 | 3/87 | Palmer. | |
| 522,491 | 7/94 | Raab | 197—15 |
| 531,352 | 12/94 | Wier | 197—15 |
| 577,982 | 3/97 | Hillard | 197—183 X |
| 694,914 | 3/02 | Evershed. | |
| 815,340 | 3/06 | Felbel | 197—34 |
| 1,037,661 | 9/12 | Ripper et al. | 74—3 |
| 1,149,042 | 8/15 | Goldstein. | |
| 1,333,119 | 3/20 | Krag-Moller. | |
| 1,690,132 | 11/28 | Rosenzweig. | |
| 1,749,367 | 3/30 | Zubaty. | |
| 1,995,780 | 3/35 | Phillips. | |
| 2,066,786 | 1/37 | Lemmon. | |
| 2,131,135 | 9/38 | Dobson | 197—35 |
| 2,168,886 | 8/39 | Roberts. | |
| 2,299,762 | 10/42 | McDermott. | |
| 2,322,065 | 6/43 | Sexton. | |
| 2,405,062 | 7/46 | Sheldon. | |
| 2,723,740 | 11/55 | Toeppen | 197—17 |
| 2,753,475 | 7/56 | Curl. | |
| 2,764,020 | 9/56 | Gadd. | |
| 2,906,387 | 9/59 | Becker | 197—5 |

ROBERT E. PULFREY, *Primary Examiner.*